United States Patent
Weng et al.

(10) Patent No.: US 9,014,171 B2
(45) Date of Patent: Apr. 21, 2015

(54) METHOD AND SYSTEM FOR UPLINK INTERFERENCE MANAGEMENT IN HETEROGENEOUS CELLULAR NETWORKS

(75) Inventors: Jianfeng Weng, Kanata (CA); Shiguang Guo, Kanata (CA); Chandra Sekhar Bontu, Nepean (CA); Andrew Mark Earnshaw, Kanata (CA)

(73) Assignee: BlackBerry Limited, Waterloo (CA)

( * ) Notice: Subject to any disclaimer, the term of this patent is extended or adjusted under 35 U.S.C. 154(b) by 471 days.

(21) Appl. No.: 13/568,587

(22) Filed: Aug. 7, 2012

(65) Prior Publication Data

US 2013/0201966 A1 Aug. 8, 2013

(30) Foreign Application Priority Data

Aug. 8, 2011 (WO) ................ PCT/CA2011/000897

(51) Int. Cl.
| | |
|---|---|
| H04W 72/08 | (2009.01) |
| H04W 72/04 | (2009.01) |
| H04W 56/00 | (2009.01) |
| H04W 72/12 | (2009.01) |
| H04W 92/20 | (2009.01) |

(52) U.S. Cl.
CPC ............ *H04W 72/082* (2013.01); *H04W 72/04* (2013.01); *H04W 72/12* (2013.01); *H04W 92/20* (2013.01); *H04W 56/0005* (2013.01); *H04W 56/0015* (2013.01)

(58) Field of Classification Search
USPC .................................................. 370/336, 350
See application file for complete search history.

(56) References Cited

U.S. PATENT DOCUMENTS

| 8,204,507 B2 | 6/2012 | Yu et al. | |
|---|---|---|---|
| 2009/0196245 A1* | 8/2009 | Ji .................................. | 370/329 |
| 2010/0222068 A1* | 9/2010 | Gaal et al. ..................... | 455/450 |

(Continued)

FOREIGN PATENT DOCUMENTS

| EP | 2190227 A1 | 5/2010 |
|---|---|---|
| WO | 2011055943 A2 | 5/2011 |
| WO | 2011088465 A1 | 7/2011 |

OTHER PUBLICATIONS

A. Agrawal, "Heterogeneous Networks: A new paradigm for increasing cellular capacity", Jan. 2009, http://netseminar.stanford.edu/seminars/01_29_09.pdf.

(Continued)

*Primary Examiner* — Dang Ton
*Assistant Examiner* — Robert M Morlan
(74) *Attorney, Agent, or Firm* — Moffat & Co.

(57) ABSTRACT

A method, at a first network access device of a heterogeneous network, the method sending a report to a second network access device indicating a user equipment (UE) in the vicinity of the second network access device to be handled in the uplink by the second network access device; receiving an uplink timing control report from the second network access device; transmitting uplink timing control adjustments to the UE; allocating uplink resources for the second network access device to forward uplink information; allocating physical downlink control channel ('PDCCH') resources belonging to the first network access device for transmitting uplink scheduling information provided by the second network access device to the UE; receiving uplink information including uplink scheduling information from the second network access device at the first network access device; and sending the uplink scheduling information to the UE.

21 Claims, 12 Drawing Sheets

(56) References Cited

U.S. PATENT DOCUMENTS

| | | | |
|---|---|---|---|
| 2010/0315956 A1* | 12/2010 | Nakao et al. | 370/245 |
| 2010/0322145 A1 | 12/2010 | Yu et al. | |
| 2010/0325506 A1 | 12/2010 | Cai et al. | |
| 2011/0171949 A1* | 7/2011 | Liao et al. | 455/422.1 |
| 2011/0223900 A1 | 9/2011 | Yu et al. | |
| 2011/0249619 A1 | 10/2011 | Yu et al. | |
| 2012/0108255 A1* | 5/2012 | Jo et al. | 455/450 |

OTHER PUBLICATIONS

TS36.423, "Evolved Universal Terrestrial Radio Access Network (E-UTRAN); X2 Application Protocol (X2AP)", Sec.8.3.1, Sep. 2009, http://www.3gpp.org/ftp/Specs/html-info/36423.htm.

A. Damnjanovic, "Interference management for LTE heterogeneous networks", http://isl.stanford.edu/colloquium/presentationSlidesFall2010/AleksDamnjanovic.pdf (Fall, 2010).

G. Berardinelli, B. E. Priyanto, T. B. Sorensen, and P. Mogensen, "Improving SC-FDMA performance by Turbo equalization in UTRA LTE uplink", http://vbn.aau.dk/files/19119881/improvingSCFDMA.pdf, Proceedings of IEEE Vehicular Technology Conference, pp. 2557-2561, May 2008.

S. W. Peters, A. Y. Panah, K. T. Truong, and R. W. Heath Jr., "Relay architectures for 3GPP LTE-Advanced", http://downloads.hindawi.com/journals/wcn/2009/618787.pdf, Published Jul. 2009. EURASIP Journal on Wireless Communications and Networking 2009, 2009:618787 doi:10.1155/2009/618787.

T. Beniero, S. Redana, J. Hamalainen, and B. Raaf, "Effect of relaying on coverage on 3GPP LTE-Advanced", http://202.194.20.8/proc/VTC09Spring/DATA/09-07-03.PDF, Proceedings of IEEE Vehicular Technology Conference, pp. 1-5, Apr. 2009.

TS 36.211, "3rd Generation Partnership Project; Technical Specification Group Radio Access Network; Evolved Universal Terrestrial Radio Access (E-UTRA); Physical channels and modulation (Release 8)", (Sep. 2007) http://www.3gpp.org/ftp/Specs/html-info/36211.htm.

TS 36.212, "3rd Generation Partnership Project; Technical Specification Group Radio Access Network; Evolved Universal Terrestrial Radio Access (E-UTRA); Multiplexing and channel coding (Release 8)", (Sep. 2007) http://www.3gpp.org/ftp/Specs/html-info/36212.htm.

Qualcomm Europe, "Signaling for spatial coordination in DL CoMP", 3GPP TSG-RAN WG1 #56, R1-090867, Feb. 2009.

3GPP TS 36.300, V10.2.0 (Dec. 2010), EUTRA/ EUTRAN; Overall Description; Stage 2 (Release 10), Published Dec. 2010.

R2-110423 Introduction of ABS definition and 2 subsets for pattern 3; CR 36.300 (3GPP TSG-RAN WG2 Meeting #72bis, Dublin, Ireland, Jan. 17-21, 2011).

R1-104256 eICIC Solutions Details. Qualcomm, 3GPP TSG RAN WG1#61bis, Jul. 2010.

R1-103824 Aspects of Pico Node Range Extension, Nokia, 3GPP TSG RAN WG1#61bis, Jul. 2010.

TS 36.133, "3rd Generation Partnership Project; Technical Specification Group Radio Access Network; Evolved Universal Terrestrial Radio Access (E-UTRA); Requirements for support of radio resource management (Release 8)", Sep. 2009.

PCT application No. PCT/CA2011/000897, International Search Report and the Written Opinion of the International Searching Authority, mailed Mar. 23, 2012.

3GPP TSG RAN WG1 Meeting #61bis, R1-103574, Dresden, Germany, Jun. 28-Jul. 2, 2010, Title: "Inter-cell Interference Mitigation between PRACH and PUCCH/PUSCH in Heterogeneous Networks", MediaTek. ftp://ftp.3gpp.org/tsg_ran/WG1_RL1/TSGR1_61b/Docs/.

* cited by examiner

METHOD AND SYSTEM FOR UPLINK INTERFERENCE MANAGEMENT IN HETEROGENEOUS CELLULAR NETWORKS

CROSS-REFERENCE TO RELATED APPLICATIONS

The present application claims priority to PCT Application Number PCT/CA2011/000897, filed Aug. 8, 2011, the entire contents of which are incorporated herein by reference.

FIELD OF THE DISCLOSURE

The present disclosure relates to heterogeneous networks and in particular to heterogeneous networks having low power nodes.

BACKGROUND

In Third Generation Partnership Program (3GPP) Long Term Evolution-Advanced (LTE-A), the introduction of a low powered node such as a pico cell or a femto cell may be exposed to significant uplink interference, since a user equipment or mobile device that may see higher signal to interference noise ratios (SINR) or received signal power from a macro cell may actually have a lower path loss to a lower power base station. Based on the received signal powers, the UE may connect to the macro base station and require a higher transmit power for uplink messages than would be required if communicating with the high powered node. Use of higher uplink power may then generate significant uplink interference for other UEs connected to the low powered node. Uplink interference includes interference from the uplink channels and signals, including the Physical Random Access Channel (PRACH), Physical Uplink Control Channel (PUCCH), Physical Uplink Shared Channel (PUSCH) and Sounding Reference Signal (SRS).

In one embodiment, uplink interference seen at a lower powered node or evolved Node B (eNB) is from interfering UEs served by a macro eNB but geographically located closer to the lower powered node or eNB. The uplink signals from interfering UEs served by the macro eNB may not be time synchronized with the uplink signals from the UEs served by the low powered nodes or eNBs. Hence, a direct use of any interference cancellation schemes in the frequency domain after a receiver fast fourier transform (Rx FFT) is difficult, since after the Rx FFT the interference not only affects the resource blocks allocated to those interfering UEs but also spills over to several neighboring resource blocks which may be allocated to other UEs.

Further, performing interference cancellation in the time domain before the Rx FFT is also difficult, since such interference cancellation needs knowledge of the uplink scheduling information for those interfering UEs at the time of arrival of the uplink signal for proper data demodulation and interference reconciliation.

A UE close to a low power node or eNB but far away from the serving macro eNB still needs to use high uplink transmit power to overcome path loss from the UE to the serving macro eNB. This may not be an efficient use of a UE's limited battery power. In other words, the macro cell coverage defined based on a macro eNB transmitting high power may be suitable for the downlink but not for the uplink, especially from the view point of inefficient use of the UE's limited battery power.

Further, scheduling information exchanged over the X2 interface for interference management may suffer from non-trivial communications delay and the delay varies in different scenarios and could be in the order of tens of milliseconds. This means that the X2 interface cannot be used to exchange downlink or uplink Hybrid Automatic Repeat Request (HARQ) related control information, as the processing times at the eNBs or the UEs for the downlink or uplink HARQ need to be small.

BRIEF DESCRIPTION OF THE DRAWINGS

The present disclosure will be better understood with reference to the drawings in which.

DETAILED DESCRIPTION

Figure 1:
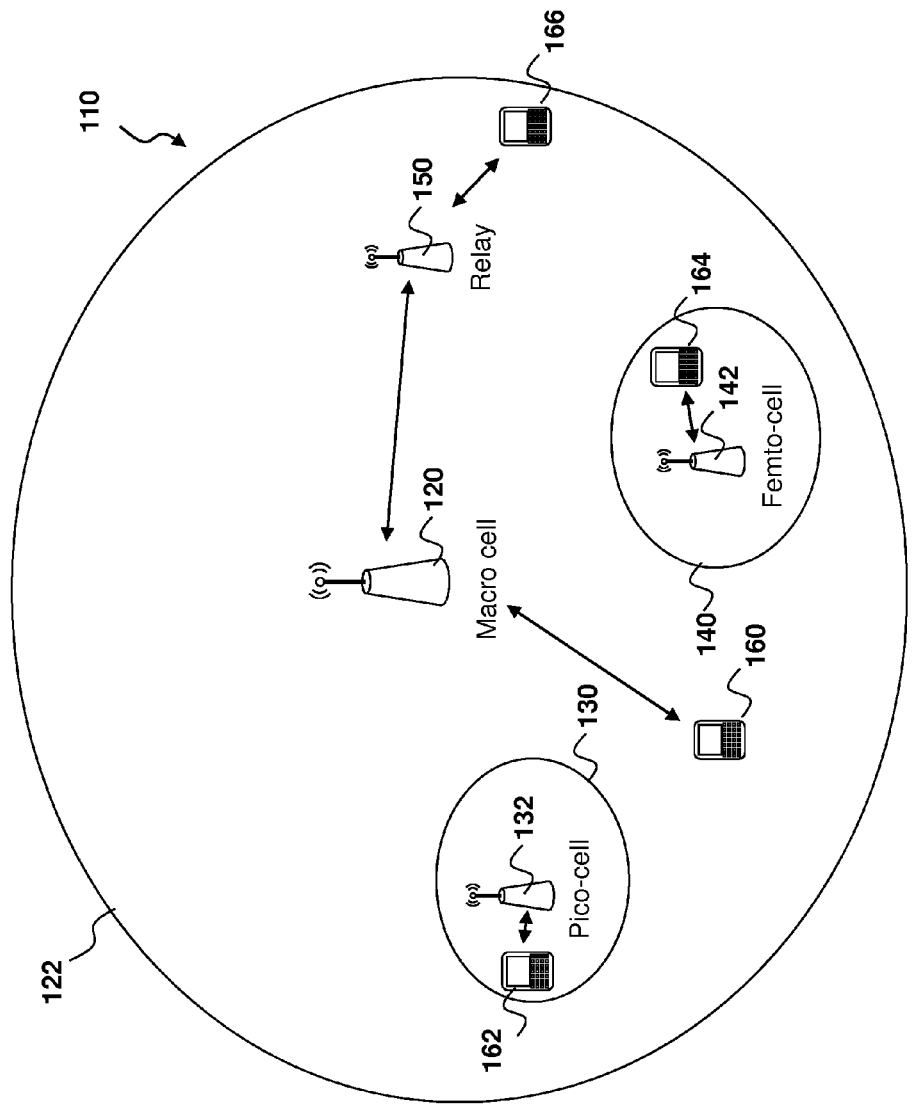
FIG. 1 is a block diagram of an exemplary heterogeneous network.

The present disclosure provides a method, at a first network access device of a heterogeneous network, the method comprising: sending a report to a second network access device indicating a user equipment (UE) in the vicinity of the second network access device to be handled in the uplink by the second network access device; receiving an uplink timing control report from the second network access device; transmitting uplink timing control adjustments to the UE; allocating uplink resources for the second network access device to forward uplink information; allocating physical downlink control channel ('PDCCH') resources belonging to the first network access device for transmitting uplink scheduling information provided by the second network access device to the UE; receiving uplink information including uplink scheduling information from the second network access device at the first network access device; and sending the uplink scheduling information to the UE.

The present disclosure further provides a first network access device of a heterogeneous network, comprising: a processor; and a communications subsystem, wherein the processor and communications subsystem cooperate to send a report to a second network access device indicating a user equipment (UE) in the vicinity of the second network access device to be handled in the uplink by the second network access device; receive an uplink timing control report from the second network access device; transmitting uplink timing control adjustments to the UE; allocate uplink resources for the second network access device to forward uplink information; allocate physical downlink control channel ('PDCCH') resources belonging to the first network access device for transmitting uplink scheduling information provided by the second network access device to the UE; receive uplink information including uplink scheduling information from the second network access device at the first network access device; and send the uplink scheduling information to the UE.

The present disclosure further provides a method, at a first network access device, for uplink scheduling of a user equipment ('UE') operating in a heterogeneous network, the method comprising: receiving a report from a second network access device indicating user equipment in the vicinity of the first network access device to be handled in the uplink by the first network access device; sending an uplink timing control report from the first network access device to the second network access device; receiving an allocation of uplink resources for the first network access device to forward uplink information; receiving an allocation of physical downlink control channel ('PDCCH') resources belonging to the second network access device to transmit uplink scheduling information provided by the first network access device; performing uplink scheduling for the UE; sending uplink information from the first network access device to the second network access device; and waiting for uplink communication for the UE.

The present disclosure further provides a first network access device, for uplink scheduling of a user equipment ('UE') operating in a heterogeneous network, comprising: a processor; and a communications subsystem, wherein the processor and communications subsystem cooperate to receive a report from a second network access device indicating user equipment in the vicinity of the first network access device to be handled in the uplink by the first network access device; send an uplink timing control report from the first network access device to the second network access device; receive an allocation of uplink resources for the first network access device to forward uplink information; receive an allocation of physical downlink control channel ('PDCCH') resources belonging to the second network access device to transmit uplink scheduling information provided by the first network access device; perform uplink scheduling for the UE; send uplink information from the first network access device to the second network access device; and wait for uplink communication for the UE.

Reference is now made to FIG. 1, which shows an exemplary heterogeneous network 110. In the embodiment of FIG. 1, a macro eNB 120 has a coverage area shown by circle 122. In order to improve coverage and data throughput, various low power nodes may be introduced. In the example of FIG. 1, a pico cell 130 having a pico cell eNB 132 is shown.

Similarly, a femto cell 140 having a femto cell Home eNB (HeNB) 142 is also shown. Further, a relay 150 is shown.

A remote radio head (RRH) could also be used, but is not shown in the embodiment of FIG. 1.

Areas 122, 130 and 140 represent target cell coverage. Target cell coverage of a macro eNB is for an initial deployment while the pico/femto eNBs can be added as needed to offer outdoor coverage and capacity increase in dense user areas such as hot spots, among others.

In addition, relay nodes can be employed for cost effective throughput enhancement and for coverage extension.

In one embodiment of the present disclosure, the pico, femto, relay, remote radio heads, as well as the related nodes, are designed to have a lower maximum transmit power than the macro eNB and therefore the downlink limited cell coverage from these eNBs or nodes is correspondingly smaller.

The examples below are illustrated with regard to a pico cell. However, this is done for illustration purposes and is not meant to be limiting. Other low power nodes including the femto cells, relays, remote radio heads, among others could be employed.

Various user equipments (UEs) are also shown in FIG. 1. For example, UE 160 is serviced by macro eNB 120. UE 162 is serviced by pico cell eNB 132. UE 164 is serviced by femto cell eNB 142. UE 166 is serviced by relay 150.

In heterogeneous networks, significant uplink interference may exist at pico cells as UEs seeing high macro signal to interference noise ratio (SINR) may have lower path loss to pico eNBs. For example, referring to FIG. 1, UE 160 is in the target cell coverage of macro eNB 120. Further, UE 160 is outside of the target cell coverage of pico eNB 142 since the pico eNB generally has a lower maximum transmit power than the macro eNB. Mathematically, the downlink power condition is illustrated as:

$$P_{Rx,Macro \to UE} > P_{Rx,Pico \to UE} \tag{1}$$

where $P_{Rx,Macro \to UE}$ and $P_{Rx,Pico \to UE}$ are the UE received powers in dB of a signal from the macro eNB and the pico eNB respectively. The powers are given by:

$$P_{Rx,Macro \to UE} = P_{Tx,Macro} - L_{Macro \to UE} \tag{2}$$

$$P_{Rx,Pico \to UE} = P_{Tx,Pico} - L_{Pico \to UE} \tag{3}$$

where $P_{Tx,Macro}$ and $P_{Tx,Pico}$ are the eNB transmit powers in dB at the macro eNB and pico eNB respectively and $P_{Tx,Macro} > P_{Tx,Pico}$ as the macro eNB has a higher transmit power than the pico eNB. Further, $L_{Macro \to UE}$ and $L_{Pico \to UE}$ are the downlink path losses in dB for macro eNB and pico eNB respectively and $L_{Macro \to UE} > L_{Pico \to UE}$ as the UE is closer to the pico eNB than the macro eNB.

Accordingly, UE 160 is served by macro eNB 120 even though UE 160 is geographically closer to pico eNB 132 than to macro eNB 120.

In the uplink, due to the use of an omni directional antenna, the transmitted signal from UE 160 might be seen by all eNBs. For example, in a common uplink single input multiple output (SIMO) case, the received signal strength at the eNB depends on the UE transmit power and the path loss from the UE to that given eNB. Thus, as UE 160 is being served by eNB 120, but is closest to pico eNB 132, UE 160 will generate significant uplink interference to pico eNB 132. More specifically, in the uplink, the received powers at macro eNB 120 and pico eNB 132 are given by:

$$P_{Rx,Macro} = P_{Tx,UE} - L_{UE \to Macro}$$

$$P_{Rx,Pico} = P_{Tx,UE} - L_{UE \to Pico} \tag{5}$$

Where $P_{Tx,UE}$ is the UE transmit power in dB, while $L_{UE \to Macro}$ and $L_{UE \to Pico}$ are the uplink path losses in dB from UE 160 to eNB 120 and from UE 160 to eNB 132 respectively.

Accordingly, $P_{Rx,Macro} < P_{Rx,Pico}$.

For example, in the special case where $P_{Rx,Macro \to UE}$ is just slightly larger than $P_{Rx,Pico \to UE}$ i.e., $L_{Macro \to UE} - L_{Pico \to UE} \approx P_{Tx,Macro} - P_{Tx,Pico}$ but the macro eNB is still selected as the serving eNB and if the downlink path loss is the same as the uplink path loss, it can be shown that:

$$P_{Rx,Macro} = P_{Tx,UE} - L_{UE \to Macro} \quad (1)$$

$$\approx P_{Tx,UE} - L_{Macro \to UE}$$

$$\approx P_{Tx,UE} - (L_{Pico \to UE} + (P_{Tx,Macro} - P_{Tx,Pico}))$$

$$\approx P_{Tx,UE} - L_{Pico \to UE} - (P_{Tx,Macro} - P_{Tx,Pico})$$

$$\approx P_{Rx,Pico} - (P_{Tx,Macro} - P_{Tx,Pico})$$

In other words, $P_{Rx,Macro} - P_{Rx,Pico} \approx -(P_{Tx,Macro} - P_{Tx,Pico})$. This means that the received power difference, excluding any fading effects, seen at the eNBs could be as high as the eNB transmit power difference, which could be more than 10 dB. A large transmit power difference between the macro eNB 120 and pico eNB 132, which would be expected for a macro eNB 120 and pico eNB 132, will result in significant uplink interference to pico eNB 132.

The macro eNB, pico eNB, femto HeNB, relay, RRH, or other network side device which the UE may use to access the network are referred to herein as a network access device.

Uplink Inference Management

In the 3GPP technical specification (TS) 36.423, "Evolved Universal Terrestrial Radio Access Network (E-UTRAN); X2 Application Protocol (X2AP)", section 8.3.1, the contents of which are incorporated herein by reference, general inter-cell interference coordination is provided by allowing an eNB to exchange, through the X2 interface, an uplink Interference Overload Indicator (IOI) and an uplink High Interference Indicator (HII) for all orthogonal frequency domain modulation (OFDM) resource blocks available for the uplink scheduling.

Figure 2:
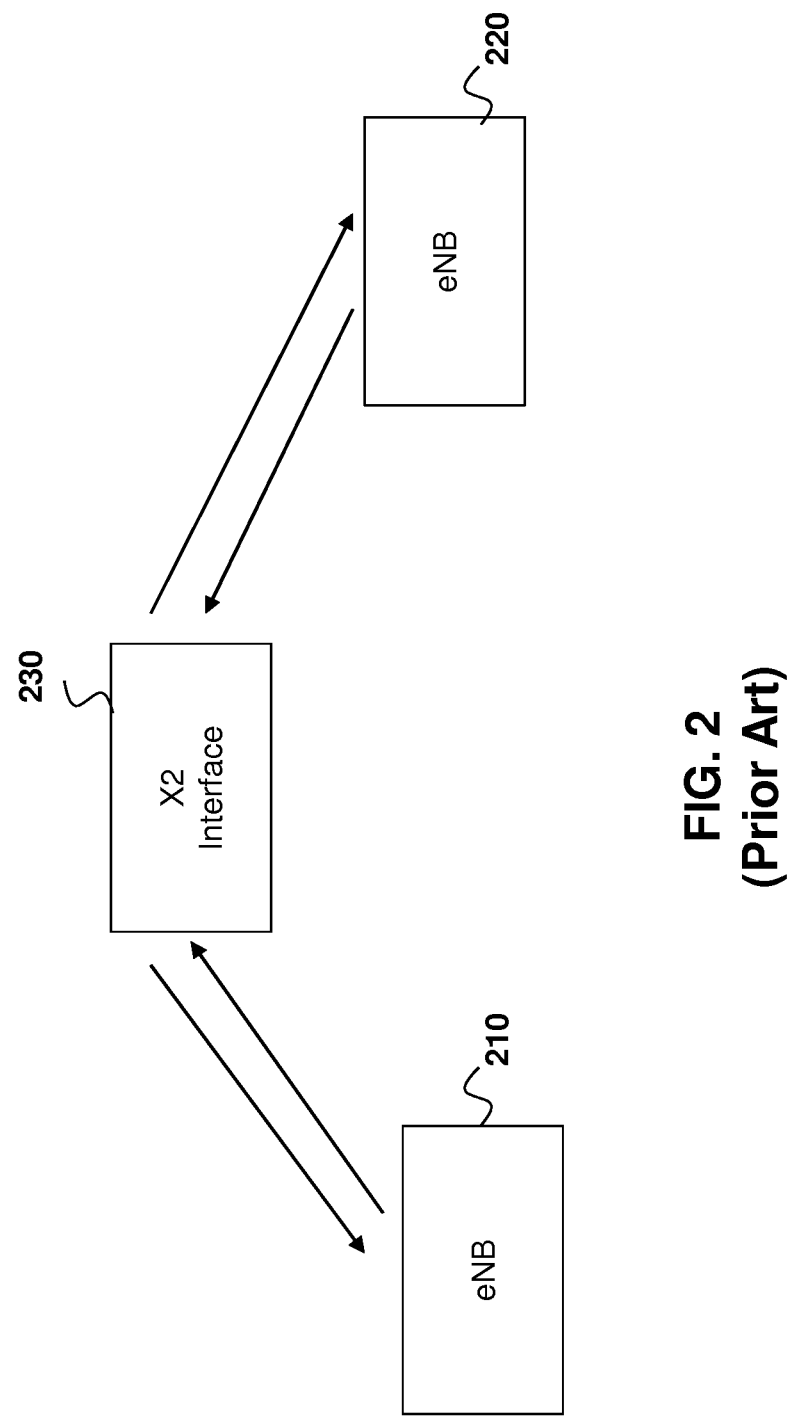
FIG. 2 is a block diagram showing uplink interference overload indicator and high interference indicator exchange between evolved node Bs over an X2 interface.

Reference is now made to FIG. 2, in which eNB 210 and eNB 220 exchange IOI and HII through an X2 interface 230.

The IOI is used to notify neighboring eNBs of the physical resource blocks (PRBs) over which the interference level is too high (overloaded) while the HII is used to notify neighboring eNBs of the PRBs over which the uplink data in the serving eNB are sensitive to high interference.

The use of IOI and HII signaling can, however, only mitigate inter-cell interference to a certain extent.

In an alternative embodiment, an uplink supplemental node (USN) may be used. The USN is an eNB or relay node that assists a serving cell with uplink transmissions and/or retransmissions from a UE. The serving node may be the donor eNB or a nearby relay node (RN), and is the node whereby the user receives its downlink control signal. The UE will select the node with the strongest downlink received signal power to be the serving node. The USN will assist the UE with uplink data transmissions and/or retransmissions. The USN may or may not assist with downlink transmissions.

Figure 3:
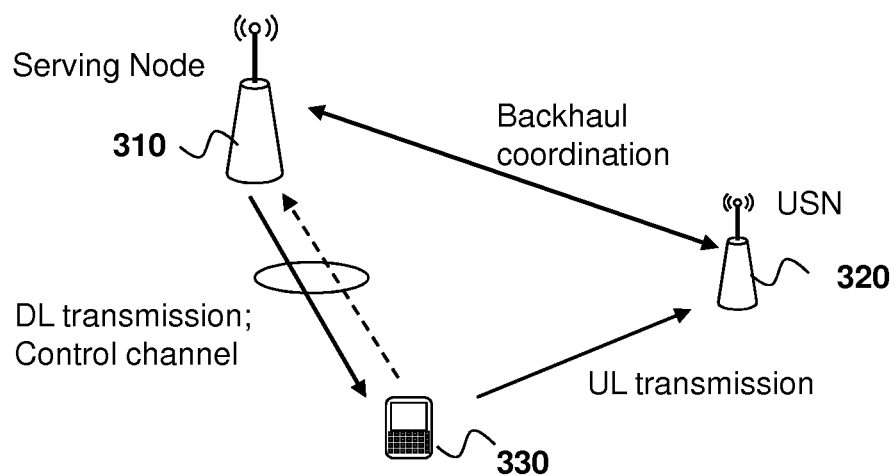
FIG. 3 is a block diagram showing a configuration of an uplink supplemental node.

Reference is now made to FIG. 3, which shows a serving node 310 and a USN 320. UE 330 provides uplink transmissions through USN 320 and receives control channel downlink transmissions from serving node 310.

In the embodiment of FIG. 3, USN 320 and serving node 310 include backhaul coordination. A wireless backhaul, in one embodiment, may contain data to be transmitted to and/or from the UE. Further, it may contain coordination control information.

As seen in FIG. 3, the dashed line between UE 330 and serving node 310 indicates that serving node 310 may also be part of the uplink transmission.

As indicated above, while the UE selects the node with the strongest downlink connection, this may result in a weak uplink connection, in which case the serving node can select a USN to help a UE's uplink transmission in order to reduce transmission power and thus reduce uplink interference.

Figure 4:
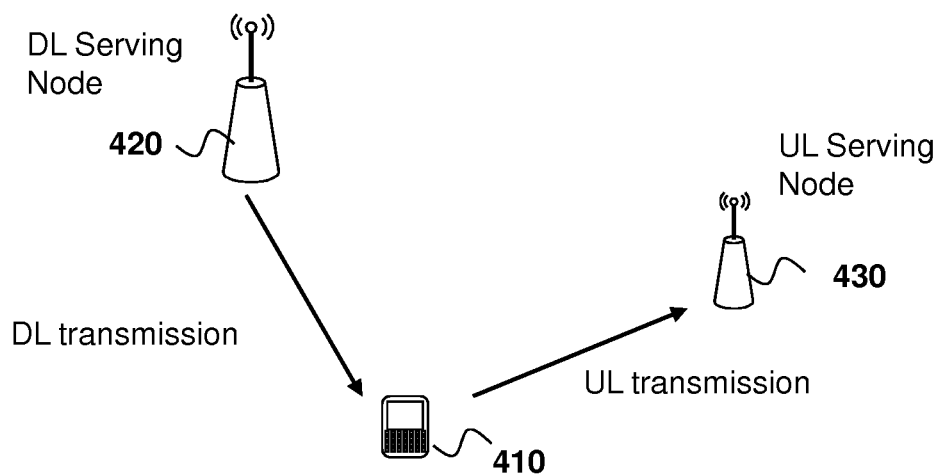
FIG. 4 is a block diagram showing a network configuration having multi-serving nodes.

In a further alternative embodiment, a multi-serving node solution is possible. In this case, UEs may have separate downlink and uplink serving nodes. Reference is now made to FIG. 4. which shows a UE 410 communicating with a downlink serving node 420 and an uplink serving node 430. The UE could select the node with the strongest downlink power for it to be the downlink serving node 420 and select the node with the lowest pathloss as the uplink serving node 430. In some cases nodes 420 and 430 may be the same node. Further, the downlink serving node for one UE could be the uplink serving node for a different UE.

Figure 5:
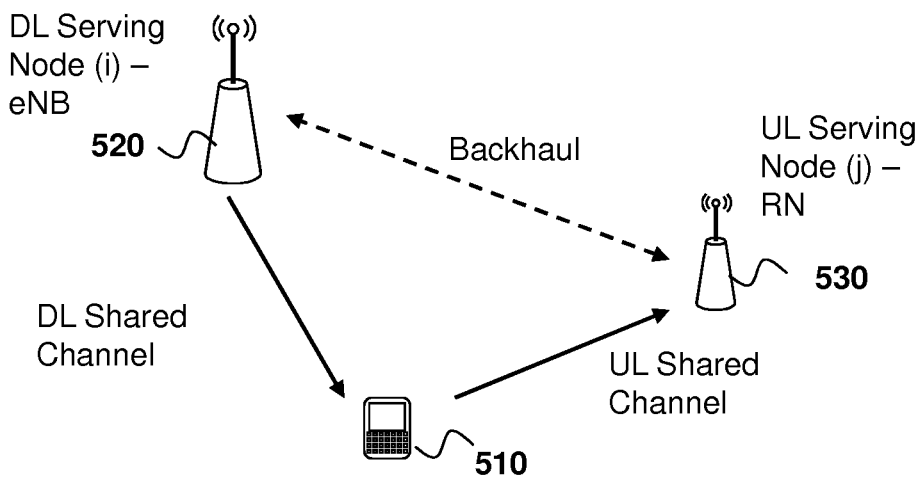
FIG. 5 is a block diagram showing the configuration of FIG. 4 in which backhaul is provided between the uplink serving node and the download serving node.

In the embodiment of FIG. 4, some communication may be required between the downlink serving node 420 and the uplink serving node 430 to convey some control information for the UE. Reference is now made to FIG. 5 which shows a backhaul channel between downlink serving node 520 and uplink serving node 530. UE 510 communicates with the downlink serving node 520 and the uplink serving node 530 as described above with regard to FIG. 4.

In one embodiment, multiple input multiple output (MIMO) techniques available to LTE or LTE-A systems may be directly applied to a multi-serving node topology such as those described with regard to FIGS. 4 and 5. The application to MIMO may be under the condition that multiple antennas are equipped in the appropriate nodes. The control channel feedbacks such as the precoding matrix indicator (PMI)/channel quality indicator (CQI)/rank indicator (RI) associated with the MIMO transmission are discussed below.

In a further embodiment, initialization and UE association procedures for Type 2 relays are provided. Basically, UE association and disassociation with the relay node (RN) can be done based on channel quality measured from initial random access preamble, uplink SRS, or a combination of random access preambles and uplink SRS. In one embodiment, for initial transmission, the eNB will transmit control information to the relay through a Un interface. The eNB will forward the corresponding medium access control (MAC) protocol data unit (PDU), or a physical transport block, to the RN. The eNB may also inform the RN when to perform the transmission.

The eNB may forward the PDCCH corresponding to the resource assignment or resource grant for a UE to the RN in advance over the Un interface. Thus, the eNB and/or the RN will transmit the MAC PDU or physical transport block to the UE in the same sub-frame, using the same resource blocks (RBs) and modulation and coding scheme (MCS) at the predetermined time.

If dynamic scheduling based retransmission is used, the eNB may notify the RN about parameters such as sub-frame, MCS, PMI and RBs, for the retransmission. If non-adaptive synchronous retransmission is used, the eNB does not need to signal the retransmission information to the RN, since the retransmission occurs at the fixed timing with the same MCS and PDSCH resource allocation as the initial transmission. In this case, the eNB and the RN will retransmit the MAC PDU or physical transport block to the UE simultaneously.

Multiple RNs may be involved in the above coordinated transmission.

For non-adaptive synchronous retransmission from the Type 2 relay, and to reduce backhaul load, in one embodiment the UE may, when it determines that a particular RN is associated with one or more UEs, enable the non-adaptive synchronous retransmission in corresponding RNs.

One issue with forwarding data and other information to the RN ahead of time is a long lead time may be required by the eNB for scheduling, PUSCH resource allocation and PDCCH construction. This may potentially reduce the dynamic scheduling flexibility of the eNB and increase latency of certain data destined to non-RN-assisted UEs. The eNB will know which UEs are communicating directly with the eNB and which UEs are in communication with a Type 2 RN. The former set of UEs can be termed non-RN-UEs while the latter set termed RN-UEs.

Certain sub-frames can be reserved for RN-UEs while remaining sub-frames may be used for dynamically scheduling non-RN-UEs. The two sets of UEs may be kept separate for scheduling purposes with RN-UEs only being scheduling into the received sub-frames.

Non-RN-UEs may be scheduled into both sets of sub-frames to avoid wasted resources. Scheduling assignments for the RN-UE sub frame may be performed further in advance by the eNB so that there would be sufficient time to communicate sub-frame information data to the RN or RNs.

Conversely, the eNB may not have to decide the resource allocations for a non-RN-UE sub-frame as far in advance as for an RN-UE sub-frame. This would give the eNB more flexibility to react to current traffic, hybrid automatic repeat request (HARQ) NACKs (negative acknowledgement), among other, for non-RN-UEs. Non-RN-UEs may not see performance degradation as a result of the presence of the Type 2 RN.

Two-Step Scheduling

Based on the above, significant uplink interference may arise at a pico eNB based on uplink interference from a UE using a distant macro eNB. The signals from the UE may not be time-synchronized, making interference calculation difficult. The high power for uplink signaling by the UE also could drain battery resources at the UE. Further, scheduling over the X2 interface may suffer from non-trivial communication delays.

The present disclosure provides a two-step scheduling approach. In accordance with one embodiment, a macro eNB performs a first step uplink scheduling by allocating uplink resources for pico eNBs to forward uplink control information and uplink scheduling information. Further, macro PDCCH resources may be used to carry the uplink scheduling information forwarded from pico eNBs.

In a second step, the pico eNB manages the uplink scheduling and uplink reception for interfering UEs and may direct those interfering UEs to have uplink time synchronization to the pico eNB.

The above allows the pico eNB to effectively manage its uplink resources and reduce uplink interference between interfering UEs being served in the uplink by the pico eNBs and other UEs being served in both downlink and uplink by the pico eNB.

Figure 6:
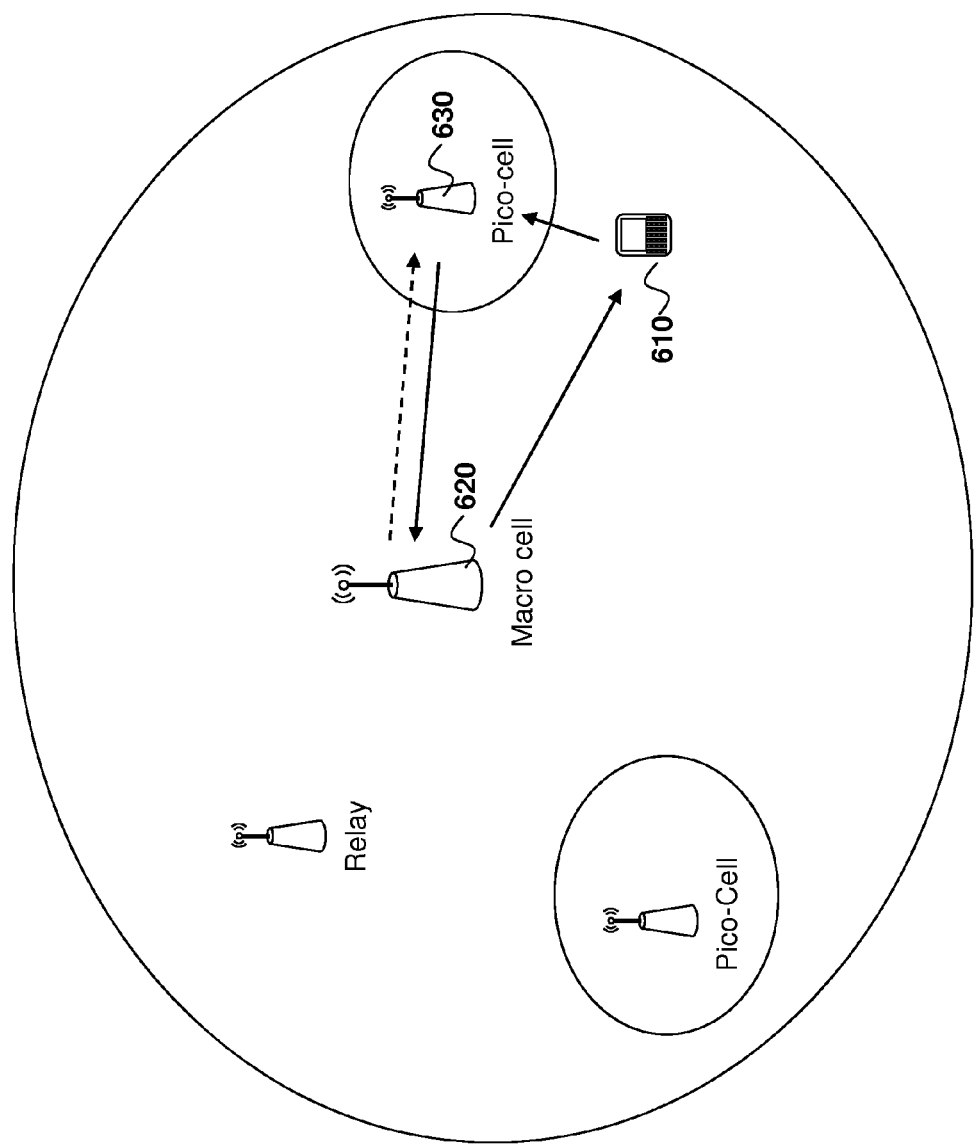
FIG. 6 is a block diagram showing two-step uplink scheduling for uplink interference management at a pico eNB.

Reference is now made to FIG. 6. In FIG. 6, UE 610 is served by macro eNB 620. However, uplink messages from the UE 610 are received and decoded by pico eNB 630.

The uplink scheduling for UE 610 is also done by pico eNB 630 but the resulting uplink scheduling information for UE 610 is forwarded to macro eNB 620 over a backhaul link or over the air. The uplink scheduling information can then be downlink transmitted by macro eNB 620 to UE 610.

Thus, based on the two-step process, the macro eNB 620 has overall control for uplink scheduling to determine when and how much second step uplink scheduling for UE 610 can be done by pico eNB 630.

The signaling involved for the embodiment of FIG. 6 above is shown below with regard to FIG. 7. UE 710 communicates with a macro eNB 720 and further may communicate in the uplink with pico eNB 730. Further, communication may exist between macro eNB 720 and pico eNB 730.

Figure 7:
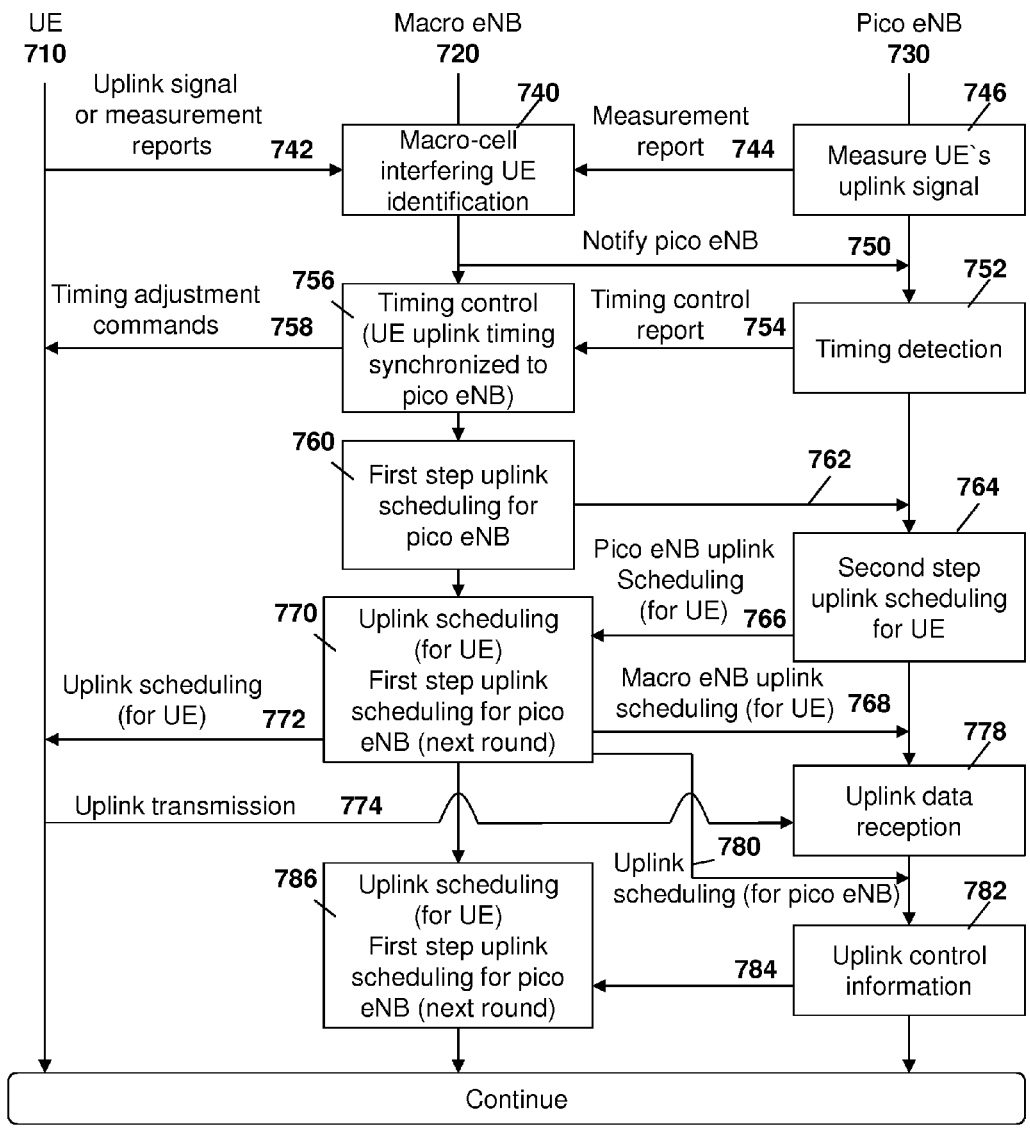
FIG. 7 is a call flow diagram showing two-step uplink scheduling between a macro and pico eNB.

In accordance with the embodiment of FIG. 7, the macro eNB 720 needs to identify macro cell interfering UEs. This is shown in block 740 where macro cell interfering UE identification is done based on criteria including, for example, uplink signal or measurement reports 742 from UE 710 or measurement reports 744 from a measurement block 746 at pico eNB 730.

Based on the identification of an interfering UE such as UE 710, macro eNB 720 notifies the pico eNB 730 of the interfering UE, as shown by arrow 750.

The uplink timing detection for the interfering UE is then done by pico eNB 730, as shown at block 752. As a result of the timing detection, a timing control report is sent to the macro eNB, as shown by arrow 754. The timing control report is used by the macro eNB 720 to determine whether to send an uplink timing adjustment command. In particular, as seen at block 756, macro eNB 720 determines whether the UE uplink timing synchronization is matched to the pico eNB and if not, timing adjustment commands are sent to UE 710, as shown by arrow 758.

In accordance with the embodiments described herein, macro eNB 720 does a first step uplink scheduling for pico eNB 730. Pico eNB does a second step scheduling for the UE 710.

In particular, as shown by block 760, the first step uplink scheduling is done at the macro eNB 720 and reported to the pico eNB 730, as shown by arrow 762. In block 760, the macro eNB 720 allocates PDCCH resources.

Pico eNB then performs second step uplink scheduling for the UE, as shown by block 764. At block 764, the pico eNB schedules both its own UEs that are serviced by the pico eNB, and the UEs that are served in downlink by the macro eNB and in uplink by the pico eNB.

Based on the results at block 764, the pico eNB 730 uplink scheduling information is passed to macro eNB 720, as shown by arrow 766 and this information may be used by macro eNB 720 in a final scheduling set that is sent to UE 710, as shown at block 770. In particular, both UE 710 and pico eNB 730 receive uplink scheduling, as shown by arrows 772 and 768 respectively. Such scheduling may, in one embodiment, be broadcast or multicast from macro eNB 720.

Based on the uplink scheduling report received at arrow 772, UE 710 sends an uplink transmission, as shown by arrow 774 to pico eNB 730 which is then received at block 778.

In the meantime, macro eNB 720, at block 770, performs the first step for the next round of uplink messaging with UE 710 and provides an indication of the first step to pico eNB 730, as shown by arrow 780. In response, pico eNB performs the second step of uplink scheduling with uplink control information, as shown by block 782 and provides feedback to macro eNB 720 for uplink scheduling for the next uplink signal, as shown by arrow 784. The uplink scheduling block 786 can then be used to send uplink scheduling information to the UE 710 (not shown).

During scheduling, the pico eNB 730 still listens to the uplink scheduling from the macro eNB 720, which makes the final decision on uplink scheduling, and does uplink reception for the UE. In other words, the macro eNB can override uplink scheduling done by the pico eNB.

The pico eNB will forward control information which may include but is not limited to uplink ACK/NACK, scheduling request (SR), CQI, PMI, downlink ACK/NACK among others to the macro eNB for the next round of uplink scheduling if needed.

Uplink Timing Synchronization

For a UE connecting to a network via a PRACH preamble from a location in the vicinity of a pico cell but having a large macro signal to interference noise ratio (SINR) the network can determine if the UE is a potential macro cell to pico cell interferer and steer that UE to have uplink timing synchronization to the pico eNB.

In one embodiment, information on the PRACH configuration at the macro eNB can be made available to the pico eNB through inter-eNB control messages such as the X2 interface, or by having the pico eNB decode downlink broadcast signals from the macro eNB. Further, eNB PRACH detections may be made by the pico eNB. Particularly, each pico eNB may monitor the potential macro cell PRACH preambles as well as the potential pico cell PRACH preambles. Once a macro cell preamble is detected at the pico eNB, the pico eNB may forward that information to the macro eNB via a fast backhaul link. When the backhaul link is wireless, the pico eNB may need to request uplink service from the macro eNB and then send the detected PRACH information. This may add some delay to the PRACH information detected at the eNB and reported to the macro eNB. With the wireless backhaul link, the delay can be made less than 8 milliseconds in one embodiment.

At the macro eNB, the macro eNB may monitor all potential macro cell PRACH preambles and associated round trip delays (RTD). The macro eNB may monitor the PRACH detection report from pico eNBs and associated RTDs. The RTD detected at the pico eNB may be different from that detected at the macro eNB. In particular, reference is made to FIG. 8, which shows the round trip delay including the propagation delay from the pico may be different from the propagation delay from the macro cell. This is shown, for example, by arrows 810 and 812 respectively.

Figure 8:
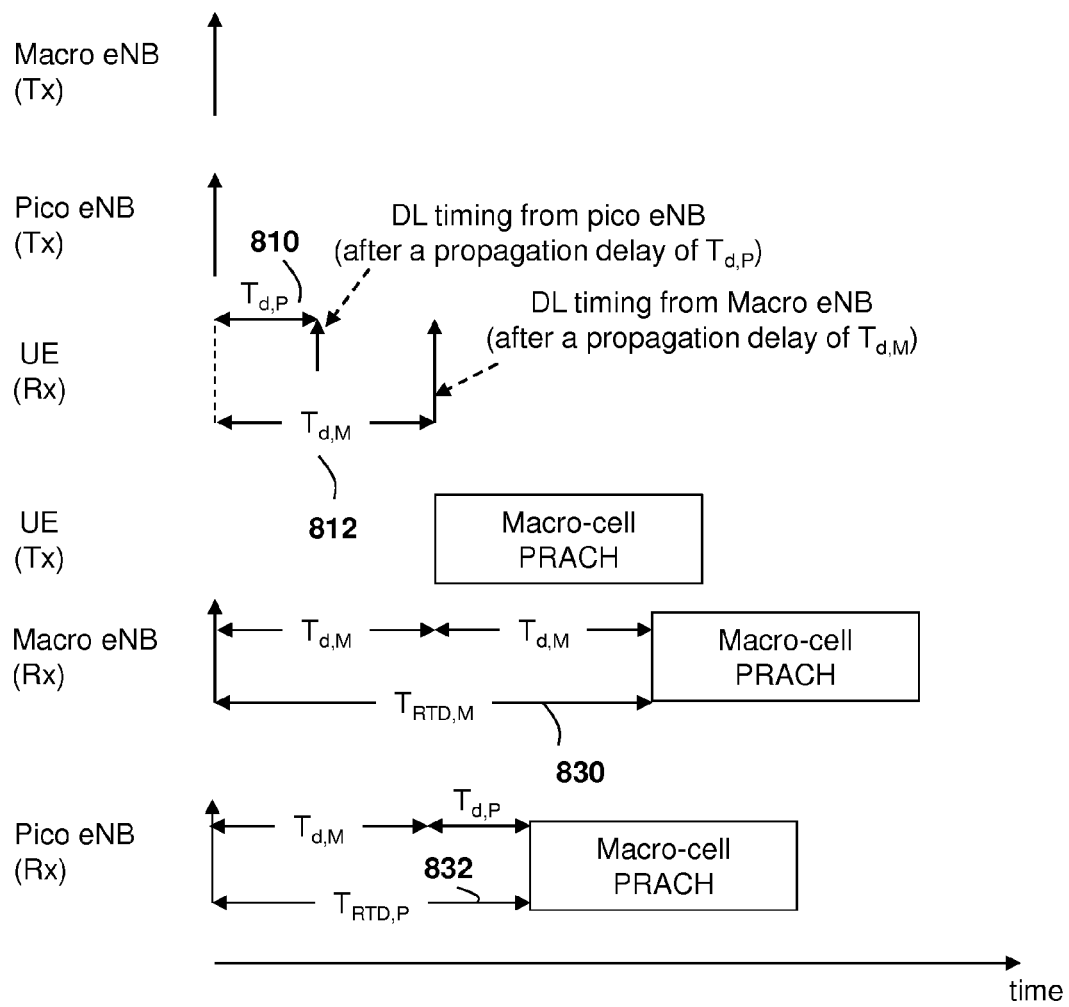
FIG. 8 is a block diagram illustrating round trip delays at a pico and a macro eNB.

As seen in FIG. 8, at the macro eNB, the round trip delay 830 is equal to twice the propagation delay to the macro 812, whereas at the pico eNB, the round trip delay 832 is equal to the propagation delay to the macro 812 plus the propagation delay to the pico cell 810.

Further, in one embodiment, relative eNB timing between the pico eNB and the macro eNB is known and can be compensated for in the RTD calculation.

The network can make use of the detected RTD to determine the time advance to be included in the PRACH response to the UE. In particular, if the macro eNB detects a macro cell PRACH preamble and the associated round trip delay is larger than a macro cell RTD threshold, this means that the UE sending the PRACH preamble is some distance away from the macro cell. The macro eNB may check if any pico eNB requests uplink service and wait for possible pico eNBs to report detection of the same macro cell PRACH preamble.

If a pico eNB reports detection of the same macro cell PRACH preamble and the difference between the detected round trip delay reported by the pico eNB and the detected round trip delay at the macro eNB is less than a round trip delay difference threshold, the UE can be identified as a UE close to the pico eNB, and hence a potential macro cell to pico cell interfering UE.

Further, once the UE is classified as a macro cell interfering UE to a pico eNB, the macro eNB will use the RTD detected at the pico eNB as the time advance needed for the UE to have an uplink timing synchronized to the pico eNB and send the PRACH response to the UE.

Once the UE receives the PRACH response, it may adjust its uplink timing. The UE does not need to know that the pico eNB will handle uplink reception and scheduling.

UEs Already Connected to the Network

For UEs that have already connected to the network, uplink timing for such UEs is described, for example, in the LTE 3GPP TS 36.133 specification.

Uplink Scheduling Coordination

Pursuant to FIG. 7 above, for the macro cell UEs identified as interfering UEs to a pico eNB, the macro eNB will handle a first step of scheduling to allocate uplink resources for pico eNBs while pico eNBs will handle the second step of uplink scheduling for those UEs.

The macro eNB needs to notify the pico eNB to handle the uplink reception for those UEs. The notification can be done through an over the air downlink message from a macro eNB to a pico eNB in one embodiment. In this embodiment, the macro eNB may treat the pico eNB as a fixed location UE.

The pico eNB may need to read uplink scheduling information for the downlink signal broadcast from the macro eNB.

The pico eNB may also forward other control information to the macro eNB. The control information may include, but is not limited to, downlink ACK/NACK from the UEs, further downlink scheduling at the macro eNB, uplink ACK/NACK decided by the pico eNB, SR, CQI, PMI, among others.

The macro eNB can reserve some uplink resources for the pico eNBs to forward the potential uplink control information.

The reserved uplink resources may be time, frequency, space or code division multiplexed among pico eNBs. The macro eNB may allocate more resources to a pico eNB if the macro eNB knows that pico eNB needs to handle more macro cell to pico cell interfering UEs.

A macro cell may make the final decision as to whether or not to include the scheduling information from the pico eNBs into a target PDCCH transmission and each pico eNB may need to confirm the uplink scheduling information from the macro eNB. That is, the pico eNB may request scheduling but this might be rejected by the macro eNB, and the pico eNB may need to monitor downlink traffic from the macro eNB to determine whether such rejection has occurred.

If a wireless access link is available between the pico eNB and the macro eNB, a pico eNB can act as a fixed location UE and read uplink scheduling information in PDCCH form from the macro eNB. As the scheduling uplink transmission from the interfering UEs will be four sub-frames later, the pico eNB may have enough time to confirm the uplink scheduling information and prepare for uplink data reception.

If a wireless access link is not available, a pico eNB may wait for a rejection notification from the macro eNB and that notification may be late. In this case, the procedure below may be used.

If the macro eNB chooses not to send UEs the uplink scheduling information from a pico eNB, the macro eNB may notify the pico eNB by sending a schedulingRejected message via the X2 interface to the pico eNB. The X2 interface may be either wireless or wire line.

The scheduling rejected message may arrive at the pico eNB late due to the potentially large latency over the X2 interface.

In the meantime, the pico eNB may attempt to decode uplink data from the macro interfering UEs by assuming the macro eNB has sent, via the macro cell PDCCH, the uplink scheduling information for those UEs. If data decoding fails, the pico eNB may schedule for HARQ retransmission.

Once the pico eNB receives the schedule rejected message, the pico eNB can adjust its uplink scheduling accordingly and start a new HARQ process, for example. At the pico eNB, uplink reception for macro cell to pico cell interfering UEs has no difference from uplink reception for UEs with both their downlink and uplink scheduled to be served by the pico eNB.

Also, since the pico eNB is receiving the uplink, the power control is also determined by the pico eNB even though the UEs are adjusting their transmit power levels based on path loss measurements performed from the downlink received signal from the macro eNB. The power adjustment control bits are determined by the pico eNB and forwarded to the macro eNB through the PDCCH.

Based on the above, the following three factors help reduce uplink interference from interfering macro cell UEs. A first factor is uplink timing from interfering macro cell UEs being instructed to be synchronized to the pico eNB. This results in interfering UEs sharing the pico cell uplink resources instead of interfering with other in cell UEs in the pico eNB.

A second factor is that uplink scheduling for interfering macro cell UEs is done at the pico cell eNB. In this way, the pico eNB can have full control of when and how interfering UEs share the pico cell uplink resources.

A third factor to reduce uplink interference is that uplink power control for interfering macro cell UEs is done at the pico eNB. As the uplink reception for the interfering macro cell UE is done at a nearby pico eNB instead of a far away macro eNB, the transmit power of the interfering macro cell can be reduced.

Uplink Reception and Scheduling Transfer

For a macro interfering UE, uplink reception scheduling may be handled by a network node other than the serving node. The network node may be referred to as the uplink serving node and the macro serving node may be referred to as the downlink serving node. As the UE moves, its uplink serving node may change and there may be a need to transfer the uplink reception scheduling for the UE from one network node to another. If the downlink serving node for the UE does not change, in one embodiment the uplink reception and scheduling transfer is done silently at the network side in a manner which is generally transparent to the UE.

Thus, whenever there is a need for uplink reception and scheduling transfer for a UE from one node to another, a message may be sent to the macro eNB and the macro eNB may then forward the information to a pico eNB if the target uplink serving node is the pico eNB instead of the macro eNB. The macro eNB may then start scheduling uplink resources and macro PDCCH room for the pico eNB.

One issue with regard to reception and scheduling transfer involves timing. The timing of a pico eNB may differ from the macro eNB. In some cases the macro eNB and pico eNB may be timing synchronized but propagation delay may need to be accounted for. In other cases the macro eNB and pico eNB may not be timing synchronized. In other cases, the timing may need to be adjusted when transferring from one uplink serving pico eNB to another uplink serving pico eNB.

If the timing difference is relatively small during the transfer, such as less than four microseconds, at the location where uplink reception is transferred between the two eNBs, one LTE time adjustment command (contained in a Timing Advance Command MAC Control Element) can be used for timing adjustment. The LTE time adjustment command can have four bits, which allows for −8 to +7 adjustment steps. One step corresponds to 0.52 microseconds, and the signal timing change is thus −4.2 microseconds to +3.6 microseconds.

Further, if the uplink timing difference is slightly larger than 4 microseconds, the timing adjustment could be broken up into two or more LTE timing adjustment commands, which would then be sent in quick succession to a UE whose uplink reception is being transferred between the two eNBs.

As will be appreciated by those in the art having regard to the present disclosure, there is no real acknowledgement of a timing adjust command (TAC) sent to a UE other than an HARQ ACK for the transport block that contains that TAC MAC control element.

Further, since a UE adjusts its timing at a sub-frame n+6 according to the timing adjustment command received at sub-frame n, there is a six sub-frame window before the UE does the timing adjustment. This means that if two timing adjustment commands are sent at sub-frames n and n+1, the UE can still send the HARQ ACK back at sub-frames n+4 and n+5.

When all eNBs are time synchronized, time synchronization to the target uplink serving node can be achieved by one uplink timing adjustment command. However if the difference is larger than 4 microseconds, it may be difficult to do multiple consecutive uplink timing adjustments until the uplink timing of the UE has been adjusted to the point to reach an uplink timing synchronization to the target serving node.

Further, in an asynchronous time network, a UE served by a macro eNB may need to support a large timing adjustment when its uplink timing needs to be uplink synchronized to a pico eNB as a secondary eNB. The UE can be ordered to gain uplink synchronization with the receiving eNB by sending the UE a PDCCH order to perform a random access procedure. Upon reception of this PDCCH order, the UE will perform a random access procedure, even if the UE currently considers itself synchronized to the UE on the uplink.

For example, if it is desired to transfer uplink reception from a UE from a macro eNB to a pico eNB, then a PDCCH order to perform a random access procedure can be sent to the UE. A dedicated PRACH preamble may be provided to the UE within this PDCCH order so that the eNB which receives the PRACH preamble transmission can immediately associate that transmission with the UE in question. The absolute timing advance adjustment in the random access response sent back to the UE in response to its PRACH preamble transmission would be calculated so as to ensure that the UE was uplink synchronized with the pico eNB rather than the macro eNB. This would allow the uplink reception to be transferred between the eNBs in a generally transparent manner to the UE, with the exception of the UE having to perform a quick random access procedure in order to resynchronize the uplink.

Further, the random access procedure may also allow the UE to quickly adjust its transmission power as appropriate for the pico eNB based on the results of the random access procedure.

Similarly, if the UE moves away from the pico eNB back to uplink synchronization with the macro eNB, the random access procedure could again be performed to adjust timing and power for the macro eNB.

Uplink Transmission Operations Dependent on the Physical Cell ID of the Downlink Serving Cell Various UE transmission operations depend on the physical cell identifier of the downlink serving cell. These include, but are not limited to PUSCH scrambling (3GPP TS 36.211, section 5.3.1); PUSCH hopping (3GPP TS 36.211, section 5.3.4); PUCCH cycle shift of base sequence (3GPP TS 36.211, section 5.4); PUCCH 2/2A/2B scrambling (3GPP TS 36.211, section 5.4.2); SRS group hopping (3GPP TS 36.211, section 5.5.1.3); SRS sequence hopping (3GPP TS 36.211, section 5.5.1.4); PUSCH demodulation reference signal (DMRS)(3GPP TS 36.211, section 5.5.2.1.1) and PUCCH DMRS (3GPP TS 36.211, section 5.2.2.1).

In normal usage, it is assumed that the same cell serves the UE on both the downlink and the uplink so there is no issue. However, when the downlink and uplink are divided, if the downlink and uplink for a given UE are served by different cells, but the downlink cell and uplink cell both have the same physical cell ID, then there is no problem and the listed uplink transmission operations may work properly. If the downlink and uplink for a given UE are served by different cells, but the downlink cell and uplink cell have different physical cell IDs, then the uplink serving cell may use the physical cell ID of the downlink serving cell rather than its own physical cell ID to decode any uplink transmissions from a UE being served in this manner.

Messaging

In the examples below, two messaging examples are provided. In a first example, a wireline X2 backhaul interface is considered. In a second example, a wireless interface is considered.

Figure 9:
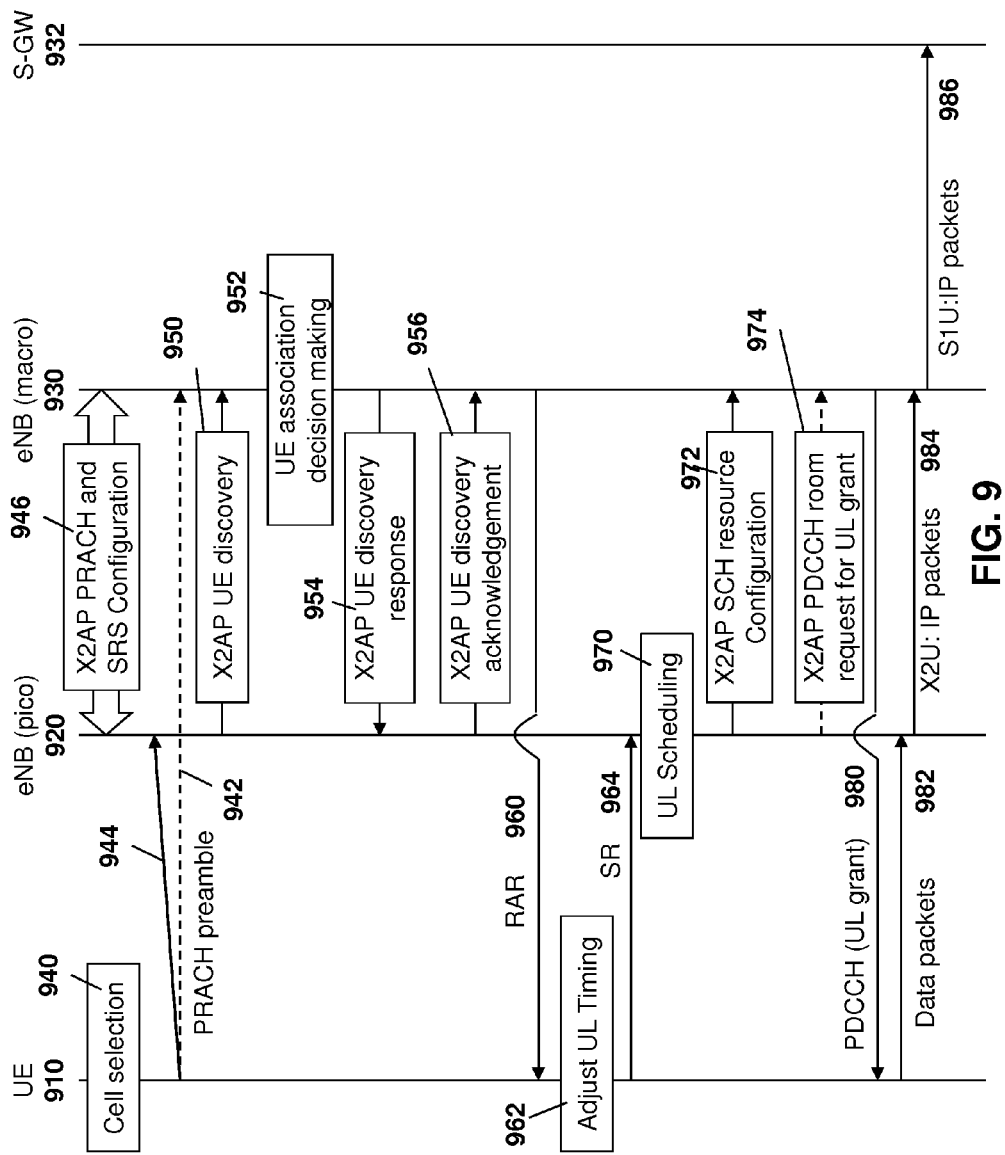
FIG. 9 is a call flow diagram showing uplink scheduling coordination over a wireline backhaul.

For the wireline X2 backhaul interface, exemplary messaging is shown in FIG. 9. In particular, FIG. 9 shows a UE 910 communicating with eNB 920 and eNB 930. In the example of FIG. 9, eNB 920 is a pico eNB and eNB 930 is a macro eNB.

Further, macro eNB 930 may communicate with a serving gateway 932.

In the embodiment of FIG. 9, pico eNB 920 is connected to an evolved packet core (EPC) and thus no donor eNB is needed and the UE is in the vicinity of the pico eNB but through its cell selection has selected the macro eNB as the target serving eNB.

The UE performs a cell selection as shown by block 940 and sends a PRACH preamble. The PRACH preamble is destined for the macro eNB 930 as shown by arrow 942 but is received by the pico eNB 920, as shown by arrow 944.

Further, prior to the PRACH preambles being received, eNB 920 and eNB 930 perform X2 PRACH and SRS configuration, as shown by block 946. The message at block 946 is used to communicate configuration details and detection criteria of PRACH and SRS of the macro eNB. Specifically, the macro eNB 930 may send PRACH preambles and SRS sequence detectors to the pico eNB 920, while pico eNB 920 may keep the resources used by the macro eNB 930 for PRACH and SRS empty or allocate these for low power transmission so that the PRACH preambles and SRS transmitted by the UEs attached to the macro eNB can be detected with reasonable accuracy.

Upon reception of the PRACH preamble at pico eNB 920, pico eNB 920 sends an X2AP UE discovery to macro eNB 930, as shown by arrow 950. Thus, if the detected PRACH preamble meets the detection criteria communicated by macro eNB 930, pico eNB 920 may send the X2AP UE discovery message to macro eNB 930 to inform the macro eNB that a UE attached to macro eNB has been detected by the pico eNB 920. The detection criteria might include a threshold on the SINR, or received power, or both. The UE discovery message may include the received power, the PRACH preamble index, the PRACH resource region, timing offset among others. In other words, the UE discovery message may include information for a random access response (RAR) and receive signal quality indicator.

As a result of receiving the X2AP UE discovery message 950, the macro eNB 930 decides which eNB should be used for the uplink, as shown by block 952.

In the example of FIG. 9, it is assumed that the macro eNB 930 decides that pico eNB 920 will be the uplink serving node and sends an X2AP UE discovery response to the pico eNB 920 indicating this. The X2AP discovery response is shown by arrow 954. This message may also include the UE's quality of service requirements.

In response to the message at arrow 954, pico eNB 920 sends an acknowledgment, shown by arrow 956. In such message, the pico eNB 920 may indicate whether it accepts or rejects the UE based on various factors such as available uplink resources at the pico eNB 920, the quality of service requirements for UE 910, as received from the macro eNB 930, among other factors.

The macro eNB 930 then sends a downlink message to UE 910 with a random access response (RAR), as shown by arrow 960, with the timing adjusted for the pico eNB 920 for the uplink.

As a result of the RAR message 960, UE 910 adjusts its uplink timing at block 962 and sends a scheduling request at message 964 when data is required to be sent in the uplink.

eNB 920 receives the scheduling request message 964 and performs uplink scheduling at block 970 and indicates to macro eNB 930 its shared channel resource configuration using an X2AP SCH resource configuration message 972. Based on advanced PDCCH room, the pico eNB 920 may grant resources to the UE in future sub-frames. During this resource allocation, pico eNB 920 may take into account delay over the backhaul for uplink SCH resource configuration message sent by pico eNB 920 to reach macro eNB 930 as well as the macro eNB 930 processing delay to pack the uplink scheduling information from the pico eNB 920 into PDCCH to be transmitted to the UEs from the macro eNB 930.

In some cases, PDCCH room may be needed and a PDCCH room request for uplink grant is shown by message 974. Thus, the pico eNB 920 may send an X2AP advanced PDCCH room request for uplink grant message 974 to macro eNB 930. Macro eNB 930 needs to allocate some advanced PDCCH room for uplink grant messages that may come from pico eNB 920. This advanced PDCCH room allocation may be shared by multiple pico eNBs and may be over a duration of multiple sub-frames. An example is shown with reference to FIG. 10.

Figure 10:
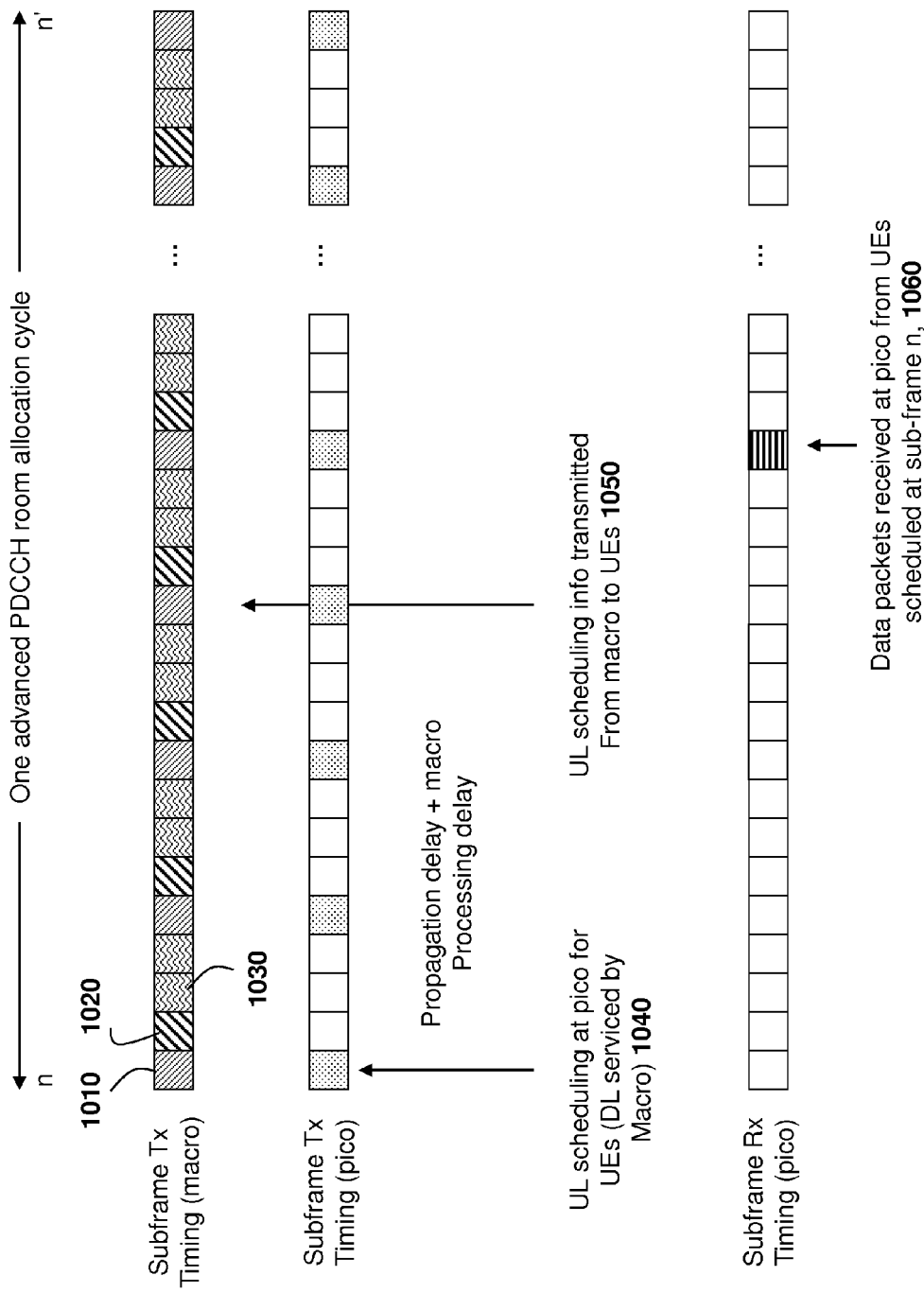
FIG. 10 shows a block diagram of sub-frames for advanced physical downlink control channel room allocation.

In FIG. 10, if the sub-frame transmission timing at the macro eNB has, for example, 80 sub-frames in an advanced PDCCH cycle, sub-frames with index n, n+4, . . . , to n+76, shown by reference 1010, have some PDCCH room for uplink grant messages from the pico eNB, sub-frames with index n+1, n+5, . . . , to n+77, shown by reference 1020, have some PDCCH room for uplink grant messages from other pico eNBs except for pico eNB 920. Other sub-frames, shown by reference 1030, have no PDCCH room allocated to any pico eNB at all.

Referring again to FIG. 9, initial advanced PDCCH form allocation may be slowly determined by the macro eNB in one embodiment, based on the number of UEs allocated to the pico eNBs for uplink servicing. Further, advanced PDCCH room allocation may be based on a request from pico eNBs.

In one embodiment, the UE may adjust the uplink transmission timing and may transmit a scheduling request (SR) based on bandwidth requirements for the uplink transmission. As a result, the pico eNB 920 is in the best position to know the needed PDCCH room for UEs with downlinks serviced by the macro eNB 930, and pico eNB 920 may send the PDCCH room request message to macro eNB 930 to request less or more advanced PDCCH room. A PDCCH room request can be sent at any time. In the example of FIG. 9, this is shown by message 974.

As a result of receiving the configuration messages at arrows 972 and 974, macro eNB 930 sends a PDCCH with an uplink grant at arrow 980 in response to the uplink scheduling request.

The UE 910 then may send data packets, as shown by arrow 982 to pico eNB 920, which may then forward the packets, as shown by arrow 984, to macro eNB 930. Macro eNB 930 may then forward the packets to the serving gateway 932, as shown by arrow 986.

Referring again to FIG. 10, backhaul delay and the macro eNB processing delay is assumed to be less than 12 milliseconds and the sub-frame transmit timing at the pico eNB 920 is synchronized so the sub-frame transmission timing at the macro eNB 930. The pico eNB 920 may perform uplink scheduling for UEs at sub-frame "n", shown by reference 1040, and the uplink scheduling information will be carried by the PDCCH sent the UE from the macro eNB at sub frame n+12, shown by reference 1050.

The uplink transmission from those UEs is expected at sub-frame n+16, shown by reference 1060. At that time, UEs transmit MAC packets to the pico eNB 920, which may then forward the IP packets to the macro eNB over the X2U interface.

In considering potential backhaul delay, there may be no time for the macro eNB 930 to communicate back to pico eNB 920 the actual transmitted PDCCH information. This means that pico eNB 920 may assume that the uplink scheduling information sent to macro eNB 930 has been included in the PDCCH and prepare for uplink transmission at sub-frame n+16, in one example.

Time stamps could be included in the shared channel resource configuration messages from the pico eNBs so that the macro eNB can actually check if a SCH resource configuration message from the pico eNB is late and should be discarded.

Wireless Scenario

When a wireless backhaul interface is used in the two-step scheduling solution, the delay is reduced and this is illustrated with regards to FIG. 11 below.

Figure 11:
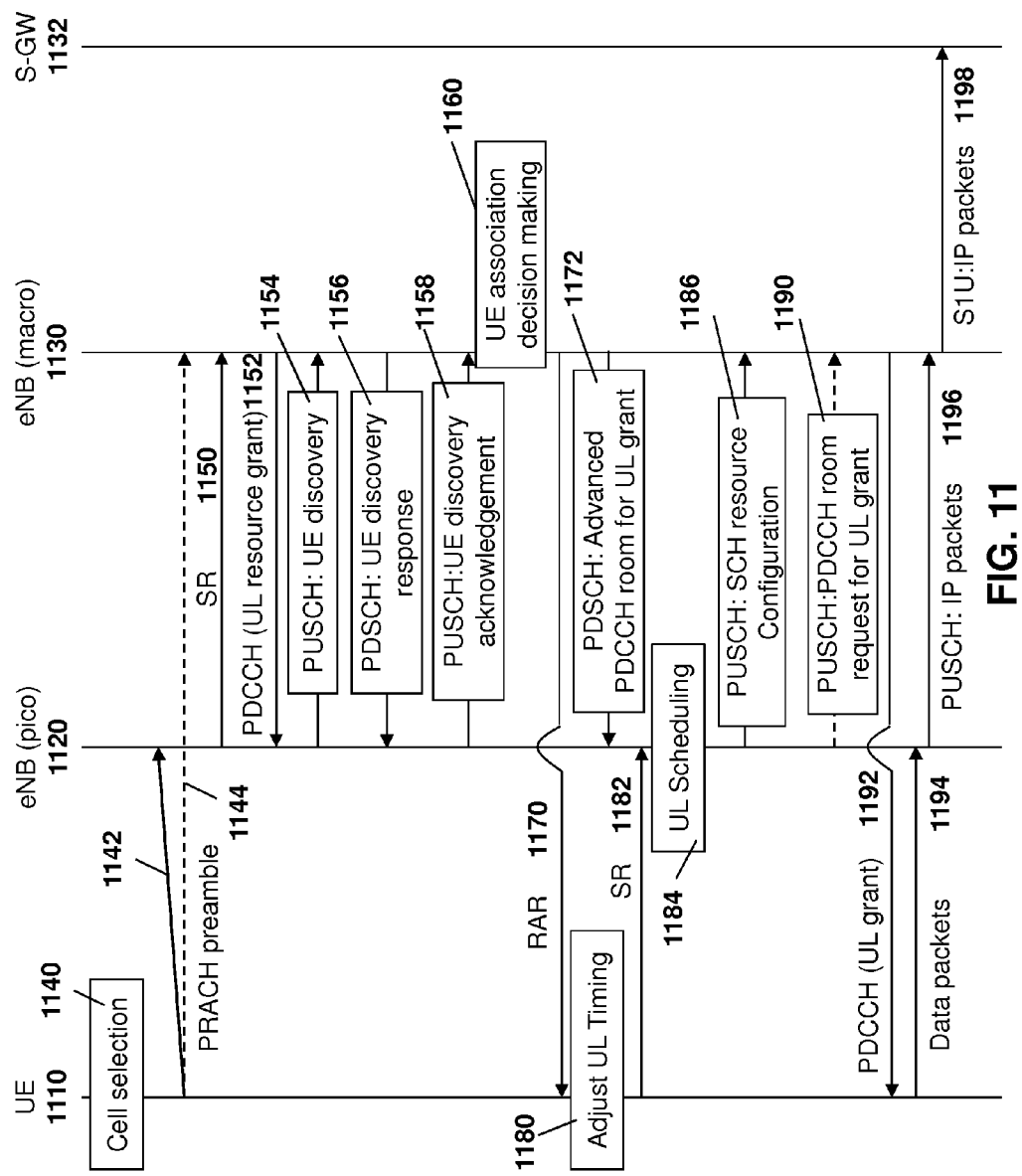
FIG. 11 is a call flow diagram showing uplink scheduling coordination over a wireless backhaul.

In the examples of FIG. 11, the UE 1110 communicates with a pico eNB 1120 and macro eNB 1130. Macro eNB 1130 communicates with a serving gateway 1132.

UE 1110 performs cell selection as shown by block 1140 and sends a PRACH preamble. The PRACH preamble may be sent to macro eNB 1130, as shown by arrow 1144, but may be received by pico eNB 1120, as shown by arrow 1142.

In response to the receipt of PRACH preamble 1142, pico eNB 1120 sends a scheduling request 1150 to macro eNB 1130. Thus, as in the above scenario, if the UE is in the vicinity of the pico eNB and selecting the macro eNB as its target serving eNB, it may initiate uplink synchronization by transmitting a PRACH preamble to the serving eNB.

The pico eNB 1120 can be treated as a special UE and thus the pico eNB is aware of the PRACH configuration and SRS configuration of the macro eNB. If the pico eNB 1120 detects the PRACH preamble as sent by a message 1142, the pico eNB 1120 needs to send a UE discovery message to the macro eNB 1130 by first sending a scheduling request as shown by arrow 1150 and waiting for an uplink resource grant from macro eNB 1130, as shown by arrow 1152. The pico eNB 1120 then sends a UE discovery message to the macro eNB 1130. The UE discovery message is shown by arrow 1154 and may include the received signal quality indicator in one embodiment.

In response to the receipt of message 1154, macro UE 1130 sends response 1156 to pico eNB 1120. In the message, the macro eNB may make a decision about whether or not the UE has better uplink communication links with the pico eNB. In the embodiment of FIG. 11, the message sent in message 1156 indicates to the pico eNB 1120 that uplink should be handled by pico eNB 1120.

In one embodiment, additional UE discovery response and UE discovery acknowledgement between the macro eNB and pico eNB can be exchanged by the wireless link.

In response to message 1156, a UE discovery acknowledgement is sent back to macro eNB 1130, as shown by message 1158.

The macro eNB 1130 decides which eNB should handle the uplink as shown by block 1160 and sends the RAR in message 1170. Macro eNB 1130 may also send an advanced PDCCH room for uplink grant message 1172 to pico eNB 1120. Macro eNB 1130 needs to allocate some advanced PDCCH room for uplink grant messages that may come from the pico eNB 1120. This is the same as that illustrated above with regard to FIG. 9. However, the information on the advanced PDCCH room is sent to the pico eNB through PDSCH in the embodiment of FIG. 11.

As a result of the receipt of message 1170, the UE adjusts its uplink timing to the pico eNB, as shown by block 1180 and sends a scheduling request as shown by arrow 1182 to request uplink resources.

The pico eNB 1120 uses information in the advanced PDCCH room for uplink grant message 1172 and the scheduling request 1182 to perform uplink scheduling, as shown by block 1184. As a result of uplink scheduling at block 1184, the pico eNB sends message 1186 for SCH resource configuration to macro eNB 1130.

The pico eNB may further send a PDCCH room request for uplink grant 1190. This is a request for more or less advanced PDCCH.

As a result of the receipt of message 1186, the macro eNB may make a decision to grant the uplink resources and provide the PDCCH uplink grant in the downlink to UE 1110, as shown by arrow 1192. Data packets may then be sent from UE 1110 to pico eNB 1120 as shown by arrow 1194, between pico eNB 1120 and macro eNB 1130, as shown by arrow 1196 and from macro eNB 1120 to the serving gateway 1132, as shown by arrow 1198.

The embodiments described above are transparent to a UE, and thus may be used with any release of UE.

The above may be implemented by any network element. A simplified network element is shown with regard to FIG. 12.

Figure 12:
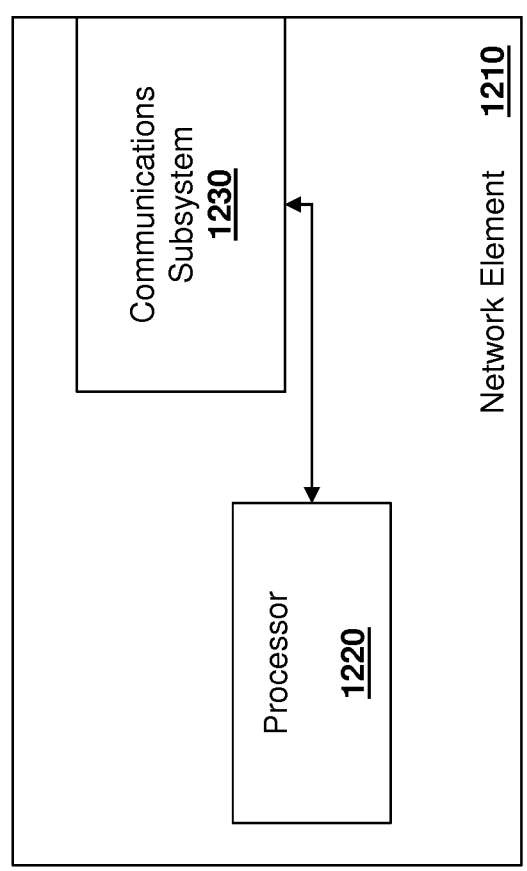
FIG. 12 is a block diagram of a simplified network element such as a macro eNB or pico eNB.

In FIG. 12, network element 1210 includes a processor 1220 and a communications subsystem 1230, where the processor 1220 and communications subsystem 1230 cooperate to perform the methods described above.

Further, the above may be implemented by any UE. One exemplary device is described below with regard to FIG. 13.

UE 1300 is typically a two-way wireless communication device having voice and data communication capabilities. UE 1300 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1300 is enabled for two-way communication, it will incorporate a communication subsystem 1311, including both a receiver 1312 and a transmitter 1314, as well as associated components such as one or more antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate.

Network access requirements will also vary depending upon the type of network 1319. In some networks network access is associated with a subscriber or user of UE 1300. A UE may require a removable user identity module (RUIM) or a subscriber identity module (SIM) card in order to operate on a network. The SIM/RUIM interface 1344 is normally similar to a card-slot into which a SIM/RUIM card can be inserted and ejected. The SIM/RUIM card can have memory and hold many key configurations 1351, and other information 1353 such as identification, and subscriber related information.

Figure 13:
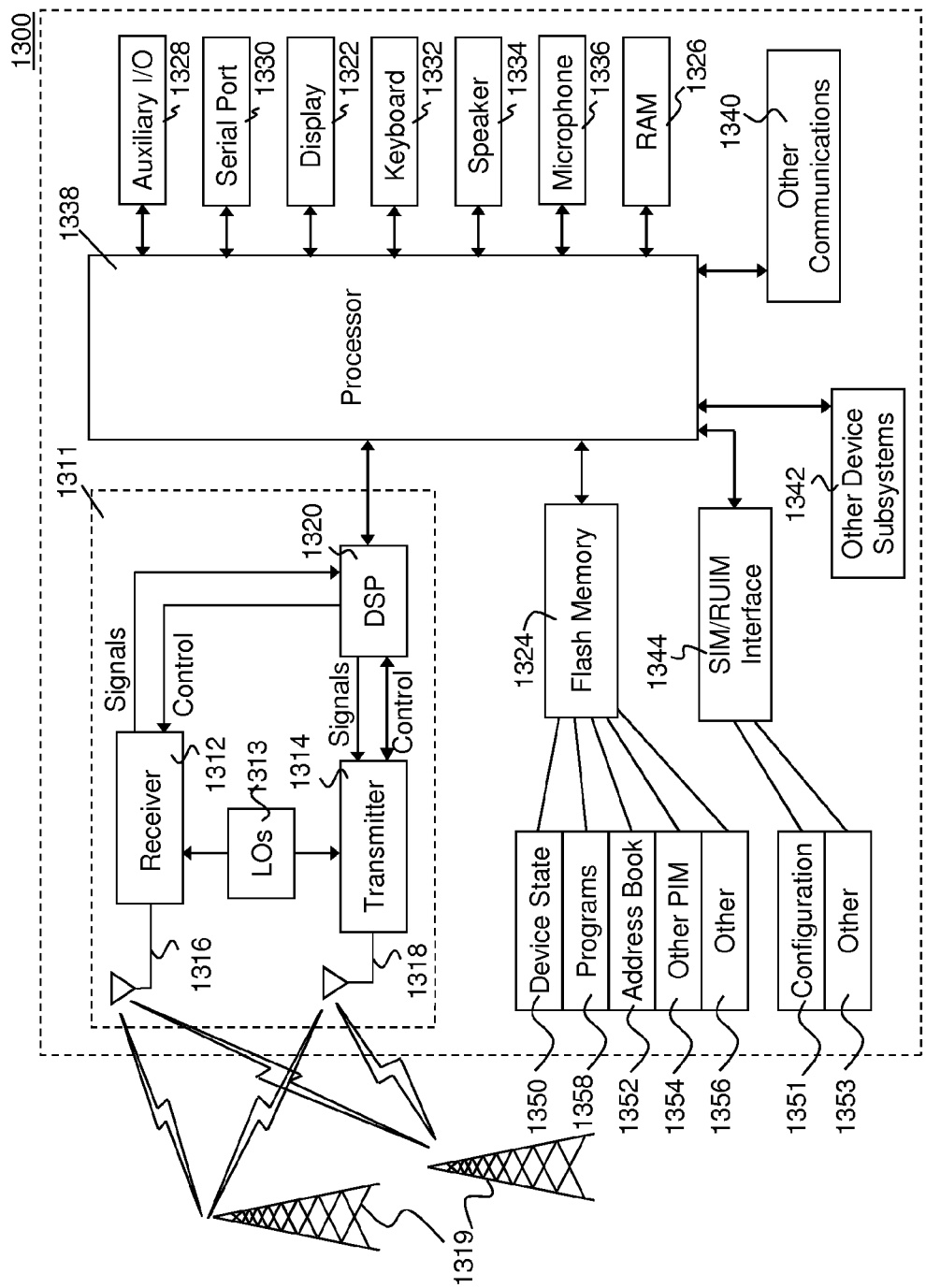
FIG. 13 is a block diagram of an exemplary user equipment.

When required network registration or activation procedures have been completed, UE 1300 may send and receive communication signals over the network 1319. As illustrated in FIG. 13, network 1319 can consist of multiple base stations communicating with the UE.

Signals received by antenna 1316 through communication network 1319 are input to receiver 1312, which may perform such common receiver functions as signal amplification, frequency down conversion, filtering, channel selection and the like. A/D conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1319 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

UE 1300 generally includes a processor 1338 which controls the overall operation of the device. Communication functions, including data and voice communications, are performed through communication subsystem 1311. Processor 1338 also interacts with further device subsystems such as the display 1322, flash memory 1324, random access memory (RAM) 1326, auxiliary input/output (I/O) subsystems 1328, serial port 1330, one or more keyboards or keypads 1332, speaker 1334, microphone 1336, other communication subsystem 1340 such as a short-range communications subsystem and any other device subsystems generally designated as 1342. Serial port 1330 could include a USB port or other port known to those in the art.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the processor 1338 may be stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Processor 1338, in addition to its operating system functions, may enable execution of software applications on the UE. A predetermined set of applications that control basic operations, including at least data and voice communication applications for example, will normally be installed on UE 1300 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1319. Further applications may also be loaded onto the UE 1300 through the network 1319, an auxiliary I/O subsystem 1328, serial port 1330, short-range communications subsystem 1340 or any other suitable subsystem 1342, and installed by a user in the RAM 1326 or a non-volatile store (not shown) for execution by the processor 1338. Such flexibility in application installation increases the functionality of the device and may provide enhanced on-device functions, communication-related functions, or both. For example, secure communication applications may enable electronic commerce functions and other such financial transactions to be performed using the UE 1300.

In a data communication mode, a received signal such as a text message or web page download will be processed by the communication subsystem 1311 and input to the processor 1338, which may further process the received signal for output to the display 1322, or alternatively to an auxiliary I/O device 1328.

A user of UE 1300 may also compose data items such as email messages for example, using the keyboard 1332, which may be a complete alphanumeric keyboard or telephone-type keypad, among others, in conjunction with the display 1322 and possibly an auxiliary I/O device 1328. Such composed items may then be transmitted over a communication network through the communication subsystem 1311.

For voice communications, overall operation of UE 1300 is similar, except that received signals would typically be output to a speaker 1334 and signals for transmission would be generated by a microphone 1336. Alternative voice or audio I/O subsystems, such as a voice message recording subsystem, may also be implemented on UE 1300. Although voice or audio signal output is preferably accomplished primarily through the speaker 1334, display 1322 may also be used to provide an indication of the identity of a calling party, the duration of a voice call, or other voice call related information for example.

Serial port 1330 in FIG. 13 would normally be implemented in a personal digital assistant (PDA)-type UE for which synchronization with a user's desktop computer (not shown) may be desirable, but is an optional device component. Such a port 1330 would enable a user to set preferences through an external device or software application and would extend the capabilities of UE 1300 by providing for information or software downloads to UE 1300 other than through a wireless communication network. The alternate download path may for example be used to load an encryption key onto the device through a direct and thus reliable and trusted connection to thereby enable secure device communication. As will be appreciated by those skilled in the art, serial port 1330 can further be used to connect the UE to a computer to act as a modem.

Other communications subsystems 1340, such as a short-range communications subsystem, is a further optional component which may provide for communication between UE 1300 and different systems or devices, which need not necessarily be similar devices. For example, the subsystem 1340 may include an infrared device and associated circuits and components or a Bluetooth™ communication module to provide for communication with similarly enabled systems and devices. Subsystem 1340 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method, at a first network access device of a heterogeneous network, the method comprising:
    sending a report to a second network access device indicating a user equipment (UE) in the vicinity of the second network access device to be handled in the uplink by the second network access device;
    receiving an uplink timing control report from the second network access device;
    transmitting uplink timing control adjustments to the UE;
    allocating uplink resources for the second network access device to forward uplink information;
    allocating physical downlink control channel ('PDCCH') resources belonging to the first network access device for transmitting uplink scheduling information provided by the second network access device to the UE;
    receiving uplink information including uplink scheduling information from the second network access device at the first network access device; and
    sending the uplink scheduling information to the UE such that uplink interference is reduced.

2. The method of claim 1, wherein the timing control adjustments adjust transmission timing of the user equipment to align with uplink reception timing at the second network access device.

3. The method of claim 2, wherein the adjusting utilizes one or more Long Term Evolution timing advance commands.

4. The method of claim 2, wherein the adjusting utilizes a PDCCH order to perform a random access procedure.

5. The method of claim 1, wherein the uplink information includes at least one of an uplink scheduling assignment for the UE; downlink acknowledgement or negative acknowledgment from the UE; uplink acknowledgement or negative acknowledgment decided by the second network access device, scheduling request, channel quality indicator; and precoding matrix indicator.

6. The method of claim 1, wherein the allocated uplink resources are at least one of time, frequency, space and code division multiplexed among a plurality of second network access devices.

7. The method of claim 1, wherein communication between the second network access device and first network access device is over a wireless interface.

8. The method of claim 7, further comprising receiving a scheduling request from the second network access device for uplink resources to be used for reporting discovery of the user equipment.

9. The method of claim 1, wherein communication between the second network access device and first network access device is over a wireline interface.

10. The method of claim 9, further comprising configuring physical random access channel and sounding reference signal resources between the first network access device and second network access device over the wireline interface.

11. The method of claim 1, wherein the first network access device allocates more or fewer PDCCH resources based on network conditions.

12. The method of claim 1, wherein the second network access device is one of a pico eNB, a femto home eNB, a remote radio head and a relay.

13. A method, at a first network access device operating in a heterogeneous network, the method comprising:
    receiving a report from a second network access device indicating a user equipment ('UE') in the vicinity of the first network access device to be handled in the uplink by the first network access device;
    sending an uplink timing control report from the first network access device to the second network access device;
    receiving an allocation of uplink resources for the first network access device to forward uplink information;
    receiving an allocation of physical downlink control channel ('PDCCH') resources belonging to the second network access device to transmit uplink scheduling information provided by the first network access device;
    performing uplink scheduling for the UE;
    sending uplink information from the first network access device to the second network access device; and
    waiting for uplink communication for the UE, wherein uplink interference is reduced.

14. The method of claim 13, wherein the uplink scheduling uses a portion of the allocation of PDCCH resources belonging to the second network access device.

15. The method of claim 13, wherein the uplink information includes at least one of an uplink scheduling assignment for the UE; downlink acknowledgement or negative acknowledgment from the UE; uplink acknowledgement or negative acknowledgment decided by the first network access device, scheduling request, channel quality indicator; and precoding matrix indicator.

16. The method of claim 13, wherein communication between the first network access device and the second network access device is over a wireless interface.

17. The method of claim 16, further comprising sending a scheduling request from the first network access device to request uplink resources for reporting discovery of the user equipment.

18. The method of claim 13, wherein communication between the first network access device and the second network access device is over a wireline interface.

19. The method of claim 18, further comprising configuring physical random access channel and sounding reference signal between the second network access device and the first network access device over the wireline interface.

20. The method of claim 13, wherein the first network access device is one of a pico eNB, a femto home eNB, a remote radio head and a relay.

21. A first network access device, comprising a processor, wherein the processor is configured to:
   send a report to a second network access device indicating a user equipment (UE) in the vicinity of the second network access device to be handled in the uplink by the second network access device;
   receive an uplink timing control report from the second network access device;
   transmit uplink timing control adjustments to the UE;
   allocate uplink resources for the second network access device to forward uplink information;
   allocate physical downlink control channel ('PDCCH') resources belonging to the first network access device for transmitting uplink scheduling information provided by the second network access device to the UE;
   receive uplink information including uplink scheduling information from the second network access device at the first network access device; and
   send the uplink scheduling information to the UE such that uplink interference is reduced.

* * * * *